US008804854B2

(12) United States Patent
Chu et al.

(10) Patent No.: US 8,804,854 B2
(45) Date of Patent: Aug. 12, 2014

(54) NETWORK RECEIVER AND ADJUSTING METHOD THEREOF

(75) Inventors: Yuan-Jih Chu, Hsinchu (TW); Liang-Wei Huang, Hsinchu (TW); Hsuan-Ting Ho, Taichung (TW); Ming-Feng Hsu, New Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 0 days.

(21) Appl. No.: 13/489,413

(22) Filed: Jun. 5, 2012

(65) Prior Publication Data
US 2012/0314748 A1 Dec. 13, 2012

(30) Foreign Application Priority Data

Jun. 7, 2011 (TW) .............................. 100119761 A (51) Int. Cl.
*H04B 3/00* (2006.01)
*H04L 25/00* (2006.01)
*H04N 5/765* (2006.01)
(52) U.S. Cl.
CPC .................................... *H04N 5/765* (2013.01)
USPC ......................................................... 375/257
(58) Field of Classification Search
USPC .......................................... 375/211, 257, 347
See application file for complete search history.

(56) References Cited

U.S. PATENT DOCUMENTS

| 6,157,688 | A | * | 12/2000 | Tamura et al. | ................ | 375/348 |
| 7,817,805 | B1 | * | 10/2010 | Griffin | .............. | 381/92 |
| 2001/0055344 | A1 | * | 12/2001 | Lee et al. | ................ | 375/257 |
| 2002/0080883 | A1 | | 6/2002 | Tamura | | |
| 2006/0176947 | A1 | | 8/2006 | Lim | | |

* cited by examiner

*Primary Examiner* — Chieh M Fan
*Assistant Examiner* — Wednel Cadeau
(74) *Attorney, Agent, or Firm* — Winston Hsu; Scott Margo (57) ABSTRACT

A network receiver and the adjusting method thereof, the network receiver includes a first delay unit, a second delay unit, a first processing unit and an adjusting circuit. The first delay unit is for delaying a first signal received from a first transmission line to generate a delayed first signal. The second delay unit is for delaying a second signal received from a second transmission line to generate a delayed second signal. The first processing unit is for processing a difference between the delayed first signal and the delayed second signal to generate first data. The adjusting circuit adjusts the first and second delay units to have a plurality of delay amount combinations, the first processing unit generates a plurality of first data respectively corresponding to the delay amount combinations, and the adjusting circuit adjusts delay amount of the first and second delay units according to the first data.

20 Claims, 5 Drawing Sheets

NETWORK RECEIVER AND ADJUSTING METHOD THEREOF

BACKGROUND OF THE INVENTION

1. Field of the Invention

The present invention relates to a network receiver, and more particularly, to a network receiver complied with high definition multimedia interface (HDMI) version 1.4 and the adjusting method thereof.

2. Description of the Prior Art

The HDMI version 1.4 has a new function named HDMI Ethernet and Audio return Channel (HEAC), where the HEAC function can make a network receiver to transmit/receive HDMI Ethernet Channel (HEC) data and Audio Return Channel (ARC) data simultaneously. Therefore, complex home network wiring can be simplified to provide a single high bandwidth and high-quality wiring in order to transfer complete images, audio, and Ethernet transports, and achieve integration of multimedia networking applications.

Figure 1:
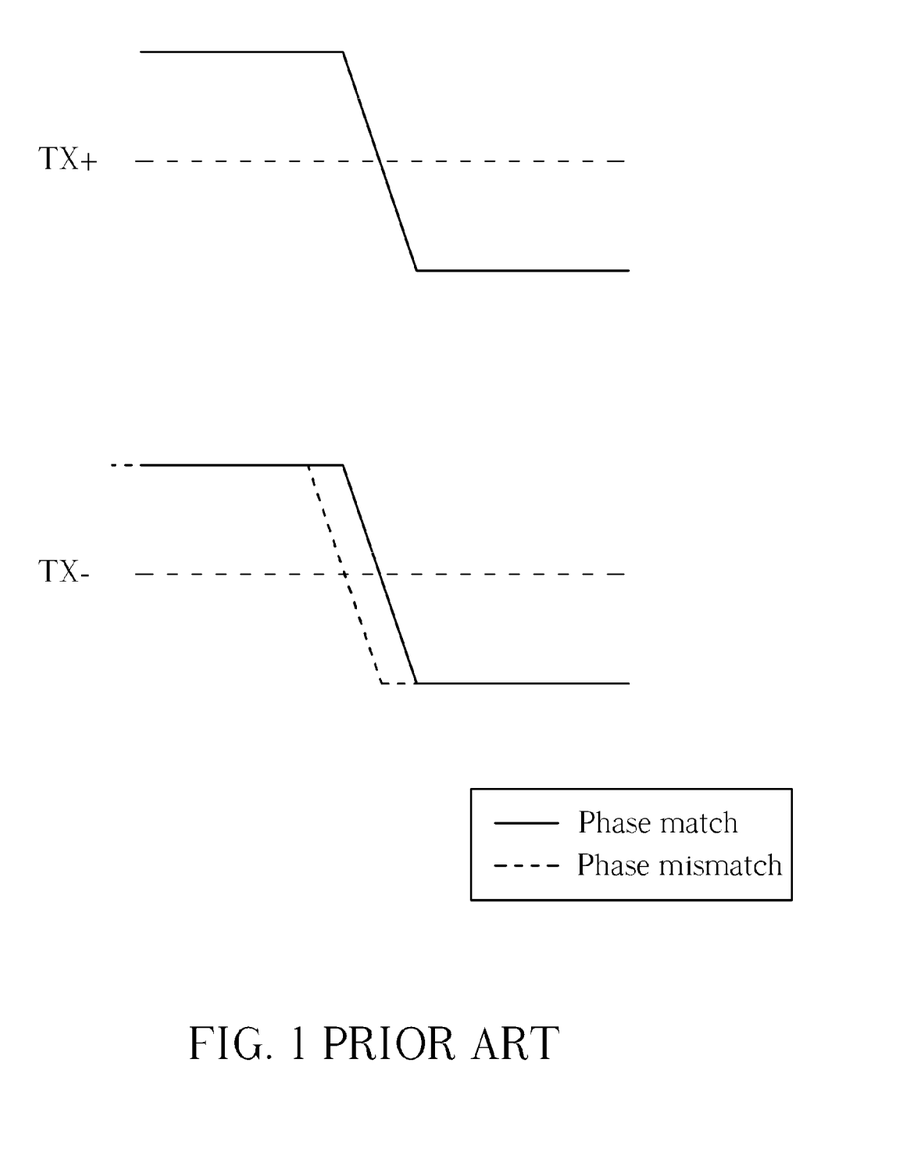
FIG. 1 shows a common mode signal carried on two transmission lines when phases of the two transmission lines are mismatched.

In the HDMI device having HEAC function, both the HEC data and the ARC data are transmitted via two transmission lines, where the transmitted HEC data is a differential mode signal, and the transmitted ARC data is a common mode signal. Ideally, the HEC data can be obtained by calculating a difference between two signals of the two transmission lines at receiving ends to cancel the common mode signal. However, referring to a common mode signal shown in FIG. 1, if the transmission lines (TX+, TX−) used to transmit HEC data and ARC data have poor quality, that is their delay times may not be the same (i.e., a phase mismatch is existed between two signals of the two transmission lines), the phases of two-halves of the received common mode signals may be different. The two-halves of the common mode signal having different phases will result in a generation of an unwanted differential mode signal, and this unwanted differential mode signal will influence the quality of the HEC data.

SUMMARY OF THE INVENTION

It is therefore an objective of the present invention to provide a network receiver and an associated adjusting method, which can keep the quality of the HEC data even when the qualities of the transmission lines are poor, to solve the above-mentioned problems.

According to one embodiment of the present invention, a network receiver comprises a first delay unit, a second delay unit, a first processing unit and an adjusting circuit. The first delay unit is coupled to a first transmission line, and is utilized for receiving a first signal from the first transmission line, and delaying the first signal to generate a delayed first signal. The second delay unit is coupled to a second transmission line, and is utilized for receiving a second signal from the second transmission line, and delaying the second signal to generate a delayed second signal. The first processing unit is coupled to the first delay unit and the second delay unit, and is utilized for calculating a difference between the delayed first signal and the delayed second signal, and processing the difference to generate first data. The adjusting circuit is coupled to the first processing unit, and is utilized for adjusting delay amount of at least one of the first delay unit and the second delay unit. The adjusting circuit adjusts the first delay unit and the second delay unit to make the first delay unit and the second delay unit have a plurality of delay amount combinations, the first processing unit generates a plurality of first data respectively corresponding to the plurality of delay amount combinations, and the adjusting circuit adjusts the delay amount of at least one of the first delay unit and the second delay unit according to the plurality of first data.

According to another embodiment of the present invention, an adjusting method of a network receiver is provided, where the network receiver comprises a first delay unit and a second delay unit, the first delay unit is coupled to a first transmission line, and the second delay unit is coupled to the second transmission line, and the adjusting method comprises: utilizing a plurality of delay amount combinations to delay a plurality of first signals from the first transmission line, respectively, to generate a plurality of delayed first signals; and utilizing the plurality of delay amount combinations to delay a plurality of second signals from the second transmission line, respectively, to generate a plurality of delayed second signals; calculating differences between the plurality of delayed first signals and plurality of delayed second signals, respectively, and process the differences to generate a plurality of first data, respectively; and adjusting delay amount of at least one of the first delay unit and the second delay unit according to the plurality of first data.

According to another embodiment of the present invention, a network receiver coupled to a first transmission line and a second transmission line comprises a first processing unit, a second processing unit and an adjusting circuit. The first processing unit comprises a subtractor, a first variable capacitor, a first low-pass filter and a first analog to digital converter, where: the subtractor is utilized for receiving a first signal from a first transmission line, receiving a second signal from a second transmission line, and calculating a difference between the first signal and the second signal; the first variable capacitor is coupled to the subtractor, and is utilized for delaying the difference to generate a delayed difference; the first low-pass filter is utilized for filtering the delayed difference to generate a filtered difference; and the first analog to digital converter is coupled to the first low-pass filter, and is utilized for performing an analog to digital conversion operation upon the filtered difference to generate the first data. The second processing unit comprises an adder, a second variable capacitor, a second low-pass filter and a second analog to digital converter, where: the adder is utilized for receiving the first signal and the second signal, and calculating a summation of the first signal and the second signal; the second variable capacitor is coupled to the adder, and is utilized for delaying the summation to generate a delayed summation; the second low-pass filter is utilized for filtering the delayed summation to generate a filtered summation; and the second analog to digital converter is coupled to the second low-pass filter, and is utilized for performing an analog to digital conversion operation upon the filtered summation to generate second data. The adjusting circuit is coupled to the first processing unit and the second processing unit, and is utilized for adjusting a capacitance of at least one of the first variable capacitor and the second variable capacitor. The adjusting circuit adjusts the first variable capacitor and the second variable capacitor to make the first variable capacitor and the second variable capacitor have a plurality of capacitance combination, the first processing unit generates a plurality of first data corresponding to the plurality of capacitance combination, and the adjusting circuit adjusting the capacitance of at least one of the first variable capacitor and the second variable capacitor according to the plurality of first data.

According to another embodiment of the present invention, an adjusting method of a network receiver is provided, where the network receiver is coupled to a first transmission line and a second transmission line, and the adjusting method comprises: (1) receiving a first signal from the first transmission line, and receiving a second signal from the second transmission line; (2) calculating a difference between the first signal and the second signal; (3) providing a first variable capacitor to delay the difference to generate a delayed difference; (4) filtering the delayed difference to generate a filtered difference; (5) performing an analog to digital conversion operation upon the filtered difference to generate first data; (6) calculating a summation of the first signal and the second signal; (7) providing a second variable capacitor to delay the summation to generate a delayed summation; (8) filtering the delayed summation to generate a filtered summation; (9) performing an analog to digital conversion operation upon the filtered summation to generate second data; (10) for a plurality of capacitance combinations of the first variable capacitor and the second variable capacitor, repeating Steps (1)-(9) to generate a plurality of first data and a plurality of second data; and (11) adjusting the capacitance of at least one of the first variable capacitor and the second variable capacitor according to the plurality of first data.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
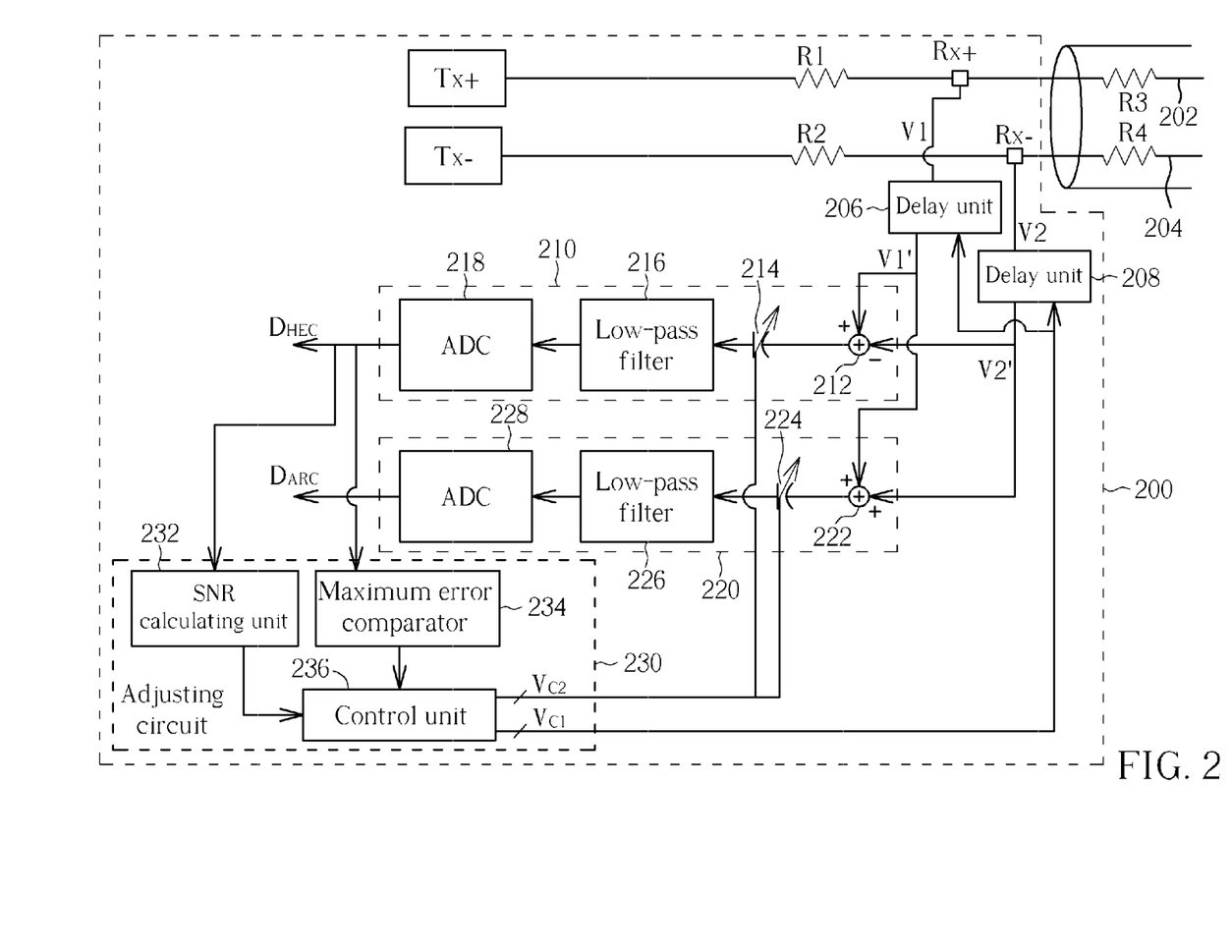
FIG. 2 is a diagram illustrating a network receiver according to one embodiment of the present invention.

Please refer to FIG. 2, which illustrates a network receiver 200 according to one embodiment of the present invention. As shown in FIG. 2, the network receiver 200 includes two resistors R1 and R2, two delay units 206 and 208, two processing units 210 and 220, an adjusting circuit 230, two signal transmitting terminals Tx+ and Tx−, and two signal receiving terminals Rx+ and Rx−, where the processing unit 210 includes a subtractor 212, a variable capacitor 214, a low-pass filter 216 and an analog-to-digital converter (ADC) 218, the processing unit 220 includes an adder 222, a variable capacitor 224, a low-pass filter 226 and an ADC 228, the adjusting circuit 230 includes a signal to noise ratio (SNR) calculating unit 232, a maximum error comparator 234 and a control unit 236. In addition, the variable resistors R1 and R2 are coupled to transmission lines 202 and 204 via the signal receiving terminals Rx+ and Rx−, respectively, where the equivalent impedances of the transmission lines 202 and 204 are represented as R3 and R4, respectively.

In this embodiment, the network receiver 200 is complied with HDMI version 1.4, and is capable of receiving/transmitting HEC data and ARC data, where the HEC data transmitted on the transmission lines 202 and 204 is a differential mode signal, and the ARC data transmitted on the transmission lines 202 and 204 is a common mode signal.

After the network receiver 200 is connected to the transmission lines 202 and 204, for a plurality of delay amount combinations of the delay unit 206 and 208, and for a plurality of capacitance combinations of the variable capacitors 214 and 216, the processing unit 210 generates a plurality of HEC data $D_{HEC}$ corresponding to the delay amount combinations and the capacitance combinations, and the control unit 236 then determines an optimal delay amount combination of the delay unit 206 and 208 and an optimal capacitance combination of the variable capacitors 214 and 216 according to SNR and maximum errors of the plurality of HEC data $D_{HEC}$.

In detail, firstly, the control unit 236 sends control signals $V_{C1}$ to adjust the delay amounts of the delay units 206 and 208 to make the delay units 206 and 208 have a first delay amount combination. Then, the delay unit 206 receives a first signal V1 from the transmission line 202 via the signal receiving terminals Rx+, and delays the first signal V1 to generate a delayed first signal V1'; on the other hand, the delay unit 208 receives a second signal V2 from the transmission line 204 via the signal receiving terminals Rx−, and delays the second signal V2 to generate a delayed second signal V2'. The subtractor 212 of the processing unit 210 calculates a difference between the delayed first signal V1' and the delayed second signal V2'. Then, the variable capacitor 214 delays the difference to generate a delayed difference, the low-pass filter 216 filters the delayed difference, and the ADC 218 performs an analog-to-digital conversion operation upon the filtered difference to generate the HEC data $D_{HEC}$. Simultaneously, the adder 222 of the processing unit 220 adds the delayed first signal V1' and the delayed second signal V2' to generate a summation. Then, the variable capacitor 224 delays the summation to generate a delayed summation, the low-pass filter 226 filters the delayed summation, and the ADC 228 performs an analog-to-digital conversion operation upon the filtered summation to generate the ARC data $D_{ARC}$.

The adjusting unit 230 performs a feedback control according to the HEC data $D_{HEC}$. The SNR calculating unit 232 receives the HEC data $D_{HEC}$, and calculates a SNR of the HEC data $D_{HEC}$. The maximum error comparator 234 receives the HEC data $D_{HEC}$, and calculates a plurality of errors of the HEC data $D_{HEC}$ by referring to differences between the HEC data $D_{HEC}$ and ideal HEC data, and determines a maximum error of the HEC data $D_{HEC}$. Then, the adjusting circuit 230 stores the SNR and the maximum error corresponding to the first delay amount combination into a storage unit (not shown), where the storage unit can be built in the control unit 236.

An example is taken to describe the operation of the maximum error comparator 234, it is noted that the flowing example is for illustrative purposes only, and is not meant to be a limitation of the present invention. Assuming that the ideal HEC data is a series of "0" and the HEC data $D_{HEC}$ outputted from the processing unit 210 is "0.2", "0.4", "0.3", "0.2", the errors of HEC data $D_{HEC}$ are "0.2", "0.4", "0.3", "0.2", respectively, and the maximum error comparator 234 selects a maximum one (i.e., "0.4") as the maximum error of the HEC data $D_{HEC}$.

In this embodiment, the SNR generated from the SNR calculating unit 232 can be used to represent a long term error/noise trend of the HEC data $D_{HEC}$, and the maximum error generated from the maximum error comparator 234 can be used to represent a short term error/noise trend of the HEC data $D_{HEC}$.

Then, the control unit 236 adjusts the delay amounts of the delay units 206 and 208 again to make the delay units 206 and 208 have a second delay amount combination. The SNR and the maximum error corresponding to the second delay amount combination are generated according to above-mentioned operations, and are stored into the storage unit. Similarly, the SNR and the maximum errors, corresponding to the other second delay amount combinations respectively, are generated and stored in the storage unit.

Finally, the control unit 236 determines an optimal delay amount combination of the delay units 206 and 208 according to the SNRs and maximum errors of the HEC data $D_{HEC}$ corresponding to the delay amount combinations. The control unit 236 adjusts the delay units 206 and 208 to have the optimal delay amount combination, and the network receiver 200 uses this setting to transmit/receive data.

In addition, the control unit 236 also sends control signals $V_{C2}$ to adjust the capacitances of the variable capacitors 214 and 224 to make the variable capacitors 214 and 224 have a first capacitance combination. Referring to the above-mentioned disclosure, the delay unit 206 receives a first signal V1 from the transmission line 202 via the signal receiving terminals Rx+, and delays the first signal V1 to generate a delayed first signal V1'; and the delay unit 208 receives a second signal V2 from the transmission line 204 via the signal receiving terminals Rx−, and delays the second signal V2 to generate a delayed second signal V2'. Then, the delayed first signal V1' and the delayed second signal V2' are processed by the processing units 210 and 220 to generate HEC data $D_{HEC}$ and ARC data $D_{ARC}$. The SNR calculating unit 232 receives the HEC data $D_{HEC}$, and calculates a SNR of the HEC data $D_{HEC}$. The maximum error comparator 234 receives the HEC data $D_{HEC}$, and calculates a plurality of errors of the HEC data $D_{HEC}$ by referring to differences between the HEC data $D_{HEC}$ and ideal HEC data, and determines a maximum error of the HEC data $D_{HEC}$. Then, the adjusting circuit 230 stores the SNR and the maximum error corresponding to the first capacitance combination into a storage unit (not shown).

Similarly, the control unit 236 adjusts the capacitances of the variable capacitors 214 and 224 again to make the variable capacitors 214 and 224 have another capacitance combination. The SNR and the maximum error corresponding to the another capacitance combination are generated according to above-mentioned operations, and are stored into the storage unit. Similarly, the SNRs and the maximum errors, corresponding to the other capacitance combinations respectively, are generated and stored in the storage unit.

Finally, the control unit 236 determines an optimal capacitance combination of the variable capacitors 214 and 224 according to the SNRs and maximum errors of the HEC data $D_{HEC}$ corresponding to the capacitance combinations. The control unit 236 adjusts the variable capacitors 214 and 224 to have the optimal capacitance combination, and the network receiver 200 uses this setting to transmit/receive data.

It is noted that, in the embodiment shown in FIG. 2, the control unit 236 determines the optimal delay amount combination of the delay units 206 and 208 according to both the SNRs and maximum errors corresponding to the plurality of delay amount combinations. However, it is not meant to be a limitation of the present invention. In another embodiment of the present invention, the control unit 236 can determine the optimal delay amount combination of the delay units 206 and 208 according to only one group of the SNRs and maximum errors corresponding to the plurality of delay amount combinations, that is one of the SNR calculating unit 232 and the maximum error comparator 234 can be removed from the adjusting circuit 230 without influencing the operations of the network receiver 200. Similarly, the control unit 236 can determine the optimal capacitance combination of the variable capacitors 214 and 224 according to only one group of the SNRs and maximum errors corresponding to the plurality of capacitance combinations.

In another embodiment of the present invention, the variable capacitors 214 and 224 can be removed from the processing units 210 and 220, respectively. That is, the low-pass filter 216 directly filters the difference outputted from the subtractor 212, the low-pass filter 226 directly filters the summation outputted from the adder 222, and the control unit 236 does not send the control signals $V_{C2}$. In addition, in another embodiment of the present invention, each of the variable capacitors 214 and 224 can be replaced by a fixed capacitor, and the control unit 236 does not send the control signals $V_{C2}$. These alternative designs should fall within the scope of the present invention.

In another embodiment of the present invention, the delay units 206 and 208 can be removed from the network receiver 200. That is, the subtractor 212 of the processing unit 210 calculates a difference between the first signal V1 and the second signal V2, the adder 222 of the processing unit 220 adds the first signal V1 to the second signal V2 to generate a summation, and the control unit 236 does not send the control signals $V_{C1}$. This alternative design should fall within the scope of the present invention.

In addition, in the above-mentioned embodiments, the network receiver 200 is complied with HDMI version 1.4, and is used to receive/transmit HEC data and ARC data. However, it is not meant to be a limitation of the present invention. In other embodiments of the present invention, the network receiver can receive first data and a second data that are complied with any other standard, where the first data is transmitted by using a differential mode signal and the second data is transmitted by using a common mode signal.

Figure 3:
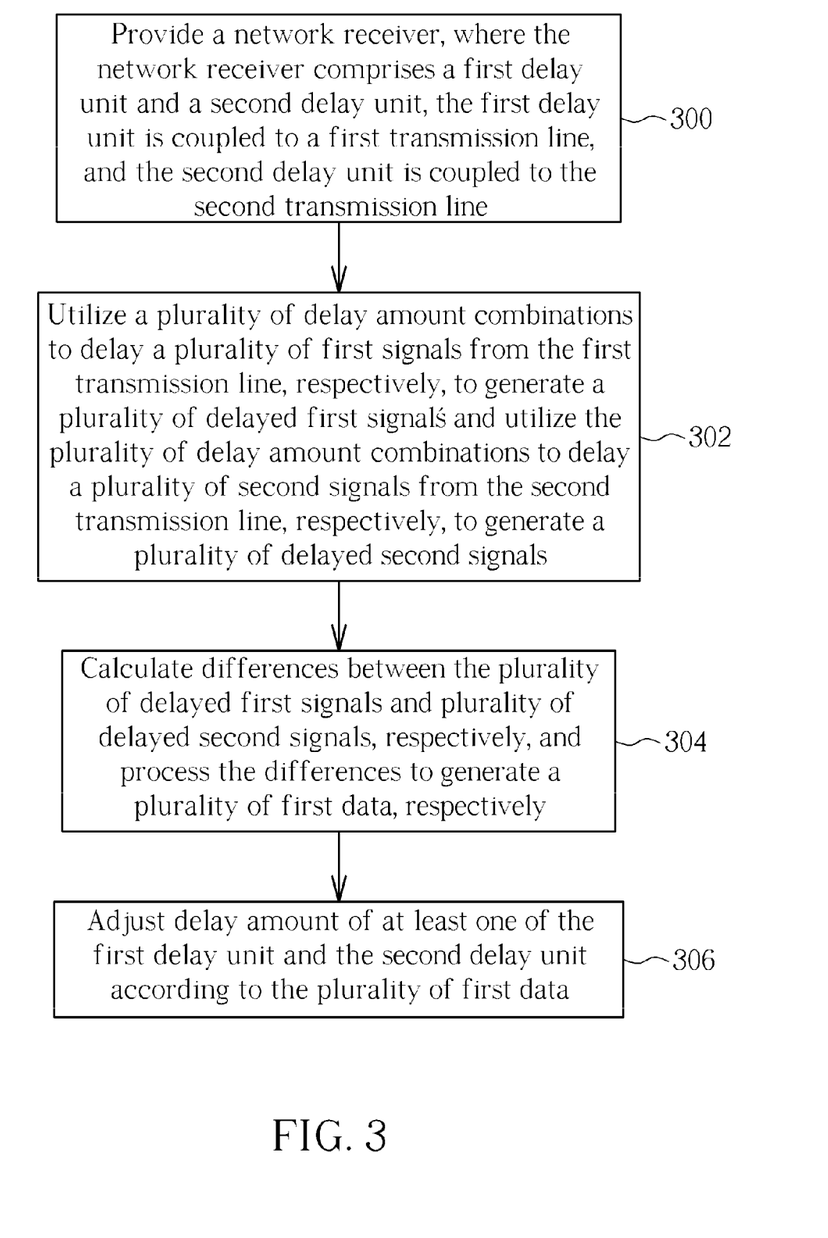
FIG. 3 is a flowchart of an adjusting method of a network receiver according to a first embodiment of the present invention.

Please refer to FIG. 3, which is a flowchart of an adjusting method of a network receiver according to a first embodiment of the present invention. Referring to FIG. 2 and FIG. 3, the flow is described as follows:

Step 300: provide a network receiver, where the network receiver comprises a first delay unit and a second delay unit, the first delay unit is coupled to a first transmission line, and the second delay unit is coupled to the second transmission line.

Step 302: utilize a plurality of delay amount combinations to delay a plurality of first signals from the first transmission line, respectively, to generate a plurality of delayed first signals; and utilize the plurality of delay amount combinations to delay a plurality of second signals from the second transmission line, respectively, to generate a plurality of delayed second signals.

Step 304: calculate differences between the plurality of delayed first signals and plurality of delayed second signals, respectively, and process the differences to generate a plurality of first data, respectively.

Step 306: adjust delay amount of at least one of the first delay unit and the second delay unit according to the plurality of first data.

Figure 4A:
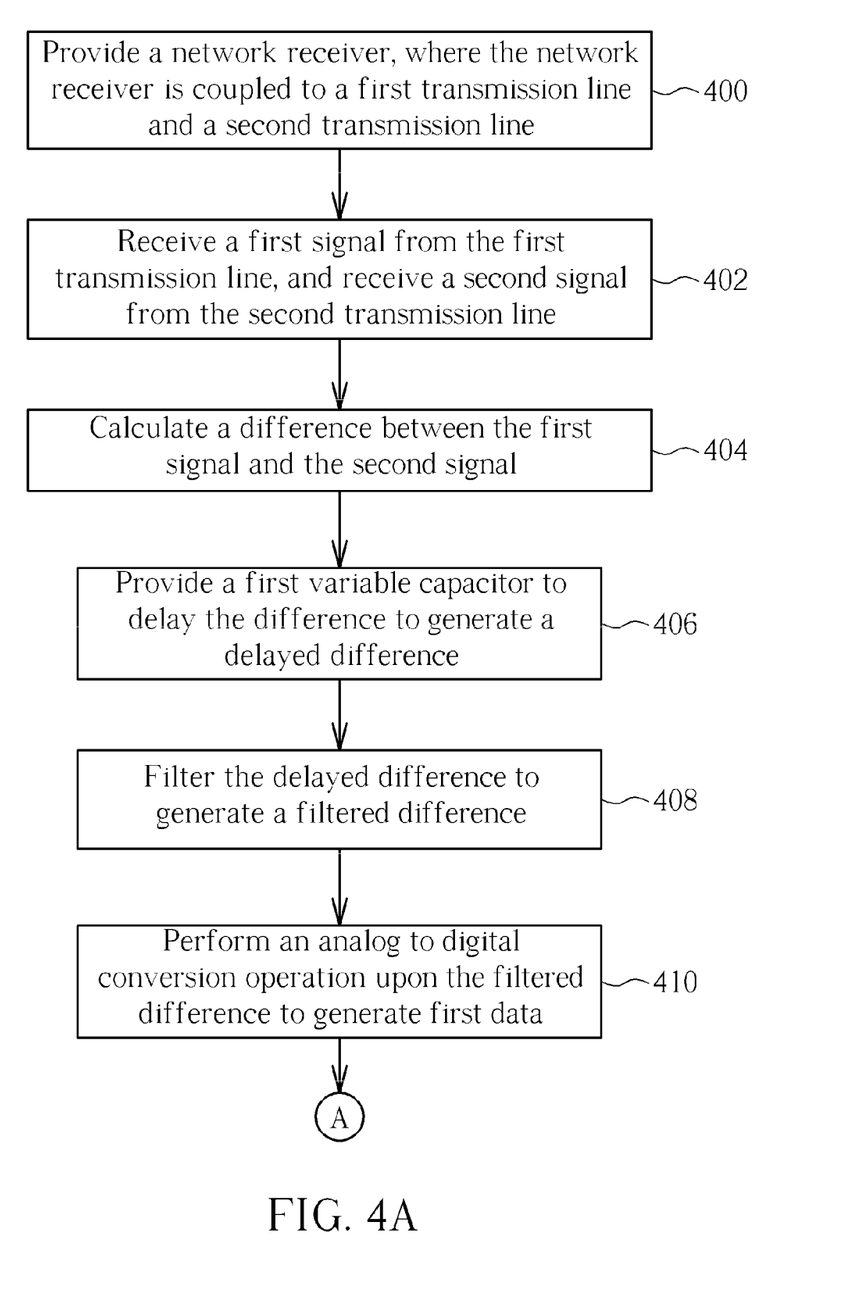
FIG. 4A and FIG. 4B are a flowchart of an adjusting method of a network receiver according to a second embodiment of the present invention.
Figure 4B:
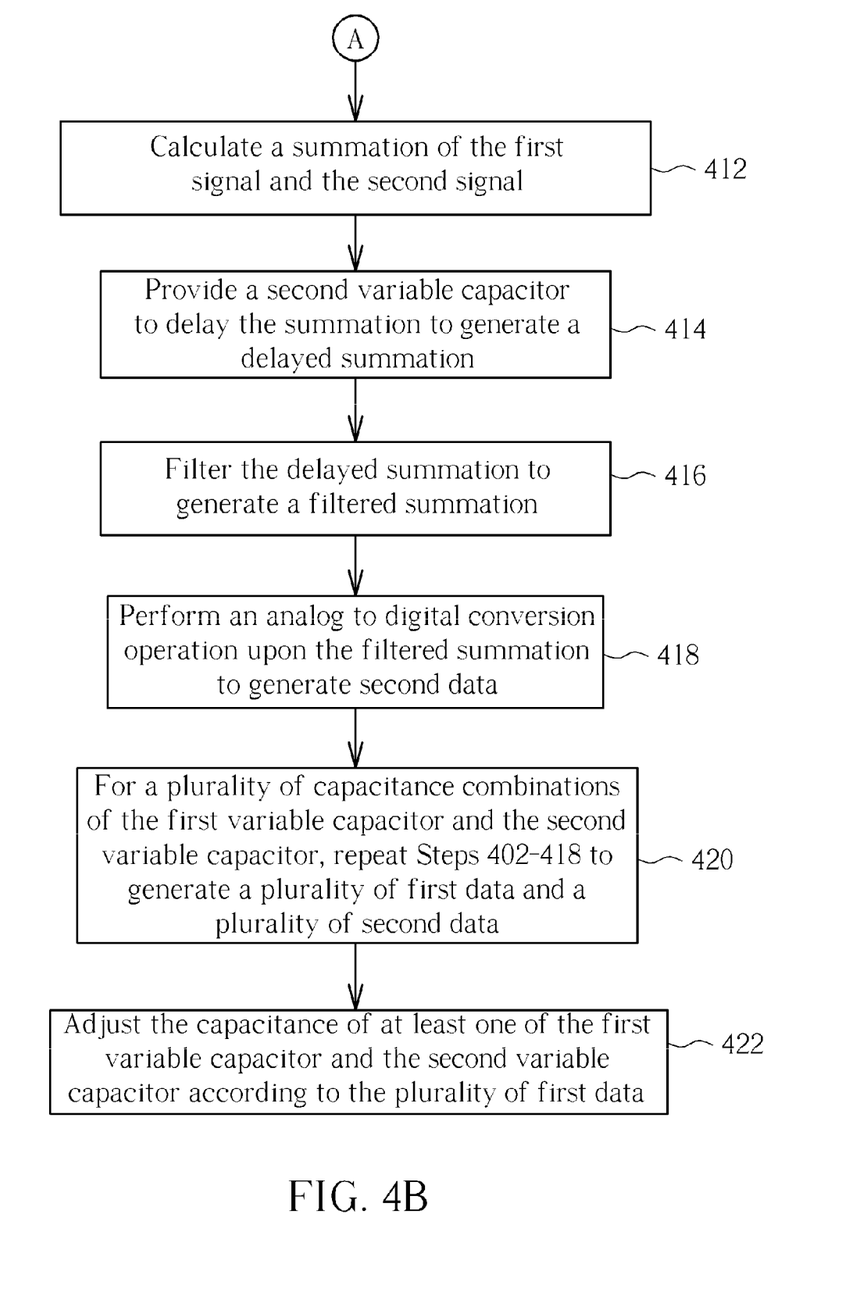

Please refer to FIG. 4A and FIG. 4B, which is a flowchart of an adjusting method of a network receiver according to a second embodiment of the present invention. Referring to FIG. 2, FIG. 4A and FIG. 4B, the flow is described as follows:

Step 400: provide a network receiver, where the network receiver is coupled to a first transmission line and a second transmission line.

Step 402: receive a first signal from the first transmission line, and receive a second signal from the second transmission line.

Step 404: calculate a difference between the first signal and the second signal.

Step 406: provide a first variable capacitor to delay the difference to generate a delayed difference.

Step 408: filter the delayed difference to generate a filtered difference.

Step 410: perform an analog to digital conversion operation upon the filtered difference to generate first data.

Step 412: calculate a summation of the first signal and the second signal.

Step 414: provide a second variable capacitor to delay the summation to generate a delayed summation.

Step 416: filter the delayed summation to generate a filtered summation.

Step 418: perform an analog to digital conversion operation upon the filtered summation to generate second data.

Step 420: for a plurality of capacitance combinations of the first variable capacitor and the second variable capacitor, repeat Steps 402-418 to generate a plurality of first data and a plurality of second data.

Step 422: adjust the capacitance of at least one of the first variable capacitor and the second variable capacitor according to the plurality of first data.

Briefly summarized, in the network receiver and the method for adjusting the network receiver, two delay units and/or two variable capacitors are provided, and delay amount of the delay units and/or the capacitances of the variable capacitors can be adjusted according to the HEC data. As described in FIG. 2, the adjusting circuit 230 generates SNR and maximum errors respectively corresponding to different delay amount combinations, and further determines an optimal delay amount combination of the delay units 206 and 208 according to the SNR and maximum errors. Furthermore, the capacitances of the variable capacitors 214 and 224 are also be optimized to cancel the phase mismatch between the first signal V1 and the second signal V2 to improve the HEC data quality. In addition, because the network receives only changes the signals at the receiving ends, the waveforms of the signals at the signal transmitting terminals Tx+ and Tx− will not be influenced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network receiver, comprising:
   a first delay unit, coupled to a first transmission line, for receiving a first signal from the first transmission line, and delaying the first signal to generate a delayed first signal;
   a second delay unit, coupled to a second transmission line, for receiving a second signal from the second transmission line, and delaying the second signal to generate a delayed second signal;
   a first processing unit, coupled to the first delay unit and the second delay unit, for calculating a difference between the delayed first signal and the delayed second signal, and processing the difference to generate first data;
   a second processing unit, coupled to the first delay unit and the second delay unit, for calculating a summation of the delayed first signal and the delayed second signal, and processing the summation to generate second data, wherein the second data is Audio Return Channel (ARC) data; and
   an adjusting circuit, coupled to the first processing unit, for adjusting delay amount of the first delay unit and the second delay unit to make the first delay unit and the second delay unit use delay amount adjusted by the adjusting unit to generate the delayed first signal and the delayed second signal, respectively, to the first processing unit;
   wherein the adjusting circuit adjusts the first delay unit and the second delay unit to make the first delay unit and the second delay unit have a plurality of delay amount combinations, the first processing unit generates a plurality of first data respectively corresponding to the plurality of delay amount combinations, and the adjusting circuit adjusts the delay amount of the first delay unit and the second delay unit according to the plurality of first data and
   the first processing unit comprises:
     a subtractor, coupled to the first delay unit and the second delay unit, for calculating the difference between the delayed first signal and the delayed second signal;
     a first variable capacitor, coupled to the subtractor, for delaying the difference to generate a delayed difference;
     a first low-pass filter, for filtering the delayed difference to generate a filtered difference; and
     a first analog to digital converter, coupled to the first low-pass filter, for performing an analog to digital conversion operation upon the filtered difference to generate the first data.

2. The network receiver of claim 1, wherein the network receiver is complied with high definition multimedia interface (HDMI) standard, and the first data is HDMI Ethernet Channel (HEC) data.

3. The network receiver of claim 1, wherein the adjusting circuit comprises:
   a signal to noise ratio (SNR) calculating unit, coupled to the first processing unit, for calculating a plurality of SNRs of the plurality of first data, respectively; and
   a control unit, coupled to the SNR calculating unit, for adjusting the delay amount of the first delay unit and the second delay unit according to the plurality of SNRs.

4. The network receiver of claim 1, wherein the adjusting circuit comprises:
   a maximum error comparator, coupled to the first processing unit, for calculating a plurality of maximum errors of the plurality of first data by referring to differences between the plurality of first data and a plurality of ideal first data, respectively, wherein each of the maximum errors is a maximum one of the data errors of the corresponding first data; and
   a control unit, coupled to the maximum error comparator, for adjusting the delay amount of the first delay unit and the second delay unit according to the plurality of maximum errors.

5. The network receiver of claim 1, wherein the adjusting circuit determines an optimal delay amount combination of the first delay unit and the second delay unit according to the plurality of first data.

6. The network receiver of claim 1, wherein the second processing unit comprises:
   an adder, coupled to the first delay unit and the second delay unit, for calculating the summation of the delayed first signal and the delayed second signal;
   a second variable capacitor, coupled to the adder, for delaying the summation to generate a delayed summation;
   a second low-pass filter, for filtering the delayed summation to generate a filtered summation; and
   a second analog to digital converter, coupled to the second low-pass filter, for performing an analog to digital conversion operation upon the filtered summation to generate the second data.

7. The network receiver of claim 3, wherein the adjusting circuit further comprises:

a maximum error comparator, coupled to the first processing unit, for calculating a plurality of maximum errors of the plurality of first data by referring to differences between the plurality of first data and a plurality of ideal first data, respectively, wherein each of the maximum errors is a maximum one of data errors of the corresponding first data;

wherein the control unit adjusts the delay amount of the first delay unit and the second delay unit according to the plurality of SNRs and the plurality of maximum errors.

8. The network receiver of claim 6, wherein the adjusting circuit adjusts a capacitance of at least one of the first variable capacitor and the second variable capacitor according to the plurality of first data.

9. The network receiver of claim 8, wherein the adjusting circuit adjusts the first variable capacitor and the second variable capacitor to make the first variable capacitor and the second variable capacitor have a plurality of capacitance combinations, the first processing unit generates the plurality of first data respectively corresponding to the plurality of delay amount combinations and the plurality of capacitance combinations, and the adjusting circuit determines an optimal delay amount combination of the first delay unit and the second delay unit, and determines an optimal capacitance combination of the first variable capacitor and the second variable capacitor according to the plurality of first data.

10. An adjusting method of a network receiver, wherein the network receiver comprises a first delay unit and a second delay unit, the first delay unit is coupled to a first transmission line, the second delay unit is coupled to the second transmission line, and delay amount of the first delay unit and the second delay unit is controlled by an adjusted unit, and the adjusting method comprising:
    utilizing the first delay unit to use a plurality of delay amount combinations provided by the adjusted unit to delay a plurality of first signals from the first transmission line, respectively, to generate a plurality of delayed first signals; and utilizing the second delay unit to use the plurality of delay amount combinations provided by the adjusted unit to delay a plurality of second signals from the second transmission line, respectively, to generate a plurality of delayed second signals;
    calculating differences between the plurality of delayed first signals and plurality of delayed second signals, respectively, and process the differences to generate a plurality of first data, respectively;
    calculating a summation of the delayed first signal and the delayed second signal, and processing the summation to generate second data, wherein the second data is Audio Return Channel (ARC) data; and
    adjusting delay amount of the first delay unit and the second delay unit according to the plurality of first data;
    wherein the step of generating each of the plurality of first data comprises:
        calculating the difference between the delayed first signal and the delayed second signal;
        providing a first variable capacitor to delay the difference to generate a delayed difference;
        filtering the delayed difference to generate a filtered difference; and
        performing an analog to digital conversion operation upon the filtered difference to generate the first data.

11. The adjusting method of claim 10, wherein the network receiver is complied with high definition multimedia interface (HDMI) standard, and the first data is HDMI Ethernet Channel (HEC) data.

12. The adjusting method of claim 10, wherein the step of adjusting the delay amount of the first delay unit and the second delay unit comprises:
    calculating a plurality of SNRs of the plurality of first data; and
    adjusting the delay amount of the first delay unit and the second delay unit according to the plurality of SNRs.

13. The adjusting method of claim 10, wherein the step of adjusting the delay amount of the first delay unit and the second delay unit comprises:
    calculating a plurality of maximum errors of the plurality of first data by referring to differences between the plurality of first data and a plurality of ideal first data, respectively, wherein each of the maximum errors is a maximum one of the data errors of the corresponding first data; and
    adjusting the delay amount of the first delay unit and the second delay unit according to the plurality of maximum errors.

14. The adjusting method of claim 10, further comprising:
    determining an optimal delay amount combination of the first delay unit and the second delay unit according to the plurality of first data.

15. The adjusting method of claim 10, wherein the step of processing the summation to generate second data comprises:
    calculating the summation between the delayed first signal and the delayed second signal;
    providing a second variable capacitor to delay the summation to generate a delayed summation;
    filtering the delayed summation to generate a filtered summation; and
    performing an analog to digital conversion operation upon the filtered summation to generate the second data.

16. The adjusting method of claim 12, wherein the step of adjusting the delay amount of the first delay unit and the second delay unit comprises:
    calculating a plurality of maximum errors of the plurality of first data by referring to differences between the plurality of first data and a plurality of ideal first data, respectively, wherein each of the maximum errors is a maximum one of data errors of the corresponding first data; and
    adjusting the delay amount of the first delay unit and the second delay unit according to the plurality of SNRs and the plurality of maximum errors.

17. The adjusting method of claim 15, further comprising:
    adjusting a capacitance of at least one of the first variable capacitor and the second variable capacitor according to the plurality of first data.

18. The adjusting method of claim 17, further comprising:
    utilizing the plurality of delay amount combinations of the first delay unit and the second delay unit and a plurality of capacitance combinations of the first variable capacitor and the second variable capacitor to generate the plurality of first data respectively corresponding to the plurality of delay amount combinations and the plurality of capacitance combinations; and
    determining an optimal delay amount combination of the first delay unit and the second delay unit, and determining an optimal capacitance combination of the first variable capacitor and the second variable capacitor according to the plurality of first data.

19. A network receiver, coupled to a first transmission line and a second transmission line, comprising:
    a first processing unit, comprising:
        a subtractor, for receiving a first signal from a first transmission line, receiving a second signal from a second transmission line, and calculating a difference between the first signal and the second signal;

a first variable capacitor, coupled to the subtractor, for delaying the difference to generate a delayed difference;

a first low-pass filter, for filtering the delayed difference to generate a filtered difference; and a first analog to digital converter, coupled to the first low-pass filter, for performing an analog to digital conversion operation upon the filtered difference to generate the first data; and a second processing unit, comprising:
an adder, for receiving the first signal and the second signal, and calculating a summation of the first signal and the second signal;

a second variable capacitor, coupled to the adder, for delaying the summation to generate a delayed summation;

a second low-pass filter, for filtering the delayed summation to generate a filtered summation; and a second analog to digital converter, coupled to the second low-pass filter, for performing an analog to digital conversion operation upon the filtered summation to generate second data; and an adjusting circuit, coupled to the first processing unit and the second processing unit, for adjusting a capacitance of at least one of the first variable capacitor and the second variable capacitor;

wherein the adjusting circuit adjusts the first variable capacitor and the second variable capacitor to make the first variable capacitor and the second variable capacitor have a plurality of capacitance combination, the first processing unit generates a plurality of first data corresponding to the plurality of capacitance combination, and the adjusting circuit adjusting the capacitance of at least one of the first variable capacitor and the second variable capacitor according to the plurality of first data.

20. An adjusting method of a network receiver, wherein the network receiver is coupled to a first transmission line and a second transmission line, the adjusting method comprising:

(1) receiving a first signal from the first transmission line, and receiving a second signal from the second transmission line;

(2) calculating a difference between the first signal and the second signal;

(3) providing a first variable capacitor to delay the difference to generate a delayed difference;

(4) filtering the delayed difference to generate a filtered difference;

(5) performing an analog to digital conversion operation upon the filtered difference to generate first data;

(6) calculating a summation of the first signal and the second signal;

(7) providing a second variable capacitor to delay the summation to generate a delayed summation;

(8) filtering the delayed summation to generate a filtered summation;

(9) performing an analog to digital conversion operation upon the filtered summation to generate second data;

(10) for a plurality of capacitance combinations of the first variable capacitor and the second variable capacitor, repeating Steps (1)-(9) to generate a plurality of first data and a plurality of second data; and (11) adjusting the capacitance of at least one of the first variable capacitor and the second variable capacitor according to the plurality of first data.

* * * * *